United States Patent
Barman et al.

(10) Patent No.: US 8,458,689 B2
(45) Date of Patent: Jun. 4, 2013

(54) METHOD AND APPARATUS FOR REPROGRAMMING ENGINE CONTROLLERS

(76) Inventors: Roderick A. Barman, Vancouver (CA); James Edward Conforti, Jr., Midvale, UT (US)

(*) Notice: Subject to any disclaimer, the term of this patent is extended or adjusted under 35 U.S.C. 154(b) by 1560 days.

(21) Appl. No.: 10/112,695

(22) Filed: Mar. 29, 2002

(65) Prior Publication Data

US 2003/0188303 A1  Oct. 2, 2003

Related U.S. Application Data

(60) Provisional application No. 60/279,711, filed on Mar. 30, 2001.

(51) Int. Cl.
*G06F 9/44* (2006.01)
*G06F 9/445* (2006.01)
*G06F 7/00* (2006.01)

(52) U.S. Cl.
USPC .......... 717/170; 717/168; 717/174; 701/31.4; 701/33; 701/33.4

(58) Field of Classification Search
USPC ............. 717/170, 173, 168; 715/783; 701/26, 701/29, 35, 55
See application file for complete search history.

(56) References Cited

U.S. PATENT DOCUMENTS

| | | | | |
|---|---|---|---|---|
| 3,446,351 A | * | 5/1969 | Born | 209/3.3 |
| 5,278,759 A | * | 1/1994 | Berra et al. | 701/1 |
| 5,430,877 A | * | 7/1995 | Naylor | 717/171 |
| 5,541,840 A | * | 7/1996 | Gurne et al. | 701/33 |
| 5,726,639 A | * | 3/1998 | Romero et al. | 340/825.22 |
| 5,787,367 A | * | 7/1998 | Berra | 701/1 |
| 5,956,665 A | * | 9/1999 | Martinez et al. | 702/188 |
| 6,023,727 A | * | 2/2000 | Barrett et al. | 709/221 |
| 6,043,816 A | * | 3/2000 | Williams et al. | 715/783 |
| 6,151,530 A | * | 11/2000 | Ino | 700/47 |
| 6,157,618 A | * | 12/2000 | Boss et al. | 370/252 |
| 6,181,992 B1 | * | 1/2001 | Gurne et al. | 701/29 |
| 6,253,281 B1 | * | 6/2001 | Hall | 711/112 |
| 6,285,948 B1 | * | 9/2001 | Takagi et al. | 701/115 |
| 6,308,325 B1 | * | 10/2001 | Dobbek | 717/178 |
| 6,363,463 B1 | * | 3/2002 | Mattison | 711/164 |
| 6,385,623 B1 | * | 5/2002 | Smith et al. | 707/200 |
| 6,493,616 B1 | * | 12/2002 | Rossow et al. | 701/29 |

(Continued)

OTHER PUBLICATIONS

[318ti] Gateway Tech 2000, Mar. 27, 2000, Brian Brown, 3 pages. [Online] [retrieved from] <http://staff.connect.com.au/lheather/318ti/2000-03/msg01243.html>.*

(Continued)

*Primary Examiner* — Thuy Dao
(74) *Attorney, Agent, or Firm* — Chernoff Vilhauer LLPx (57) ABSTRACT

The invention relates to methods and apparatus for altering the software of engine controllers. The method comprises determining a version of the current software in the engine controller, identifying one or more data blocks of upgraded software associated with the current software and replacing portions of the current software with the data blocks of upgraded software. The apparatus comprises an interface, a memory and a processor. The processor is configured to determine the version of the current software in the engine controller and replace one or more data blocks of the current software with one or more data blocks of upgraded software stored in the memory.

34 Claims, 5 Drawing Sheets

U.S. PATENT DOCUMENTS

| | | | | |
|---|---|---|---|---|
| 6,523,083 | B1* | 2/2003 | Lin et al. | 711/103 |
| 6,560,604 | B1* | 5/2003 | Fascenda | 707/10 |
| 6,622,302 | B1* | 9/2003 | Delaney et al. | 717/170 |
| 6,675,258 | B1* | 1/2004 | Bramhall et al. | 711/114 |
| 6,677,861 | B1* | 1/2004 | Henry et al. | 340/855.3 |
| 6,732,031 | B1* | 5/2004 | Lowrey et al. | 701/31.4 |
| 6,813,248 | B1* | 11/2004 | Boss et al. | 370/252 |
| 6,819,986 | B2* | 11/2004 | Hong et al. | 701/33.4 |
| 6,820,259 | B1* | 11/2004 | Kawamata et al. | 717/173 |
| 6,990,661 | B2* | 1/2006 | Dobbek | 717/174 |
| 7,237,239 | B1* | 6/2007 | Goel et al. | 717/170 |
| 7,243,347 | B2* | 7/2007 | Palmer et al. | 717/170 |
| 2003/0163233 | A1* | 8/2003 | Song et al. | 701/33 |
| 2004/0015939 | A1* | 1/2004 | Cheah et al. | 717/168 |
| 2004/0024502 | A1* | 2/2004 | Squires et al. | 701/33 |

OTHER PUBLICATIONS

[318ti] Re: Shark Injector (was Gateway Tech 2000), Mar. 29, 2000, Joseph Koral, 2 pages. [Online] [retrieved from] <http://staff.connect.com.au/lheather/318ti/2000-03/msg01306.html>.*

"BMW CCA Club Racing 2000 Schedule", 1 page. [Online] [Retrieved at] <http://bmwccaclubracing.com/Archives/2000Series/00schedule.htm>.*

"[uucdigest] V3 #511", BMW UUC Digest, Mar. 26, 2000 (11 pages). [Online] [Retrieved at] <www.mail-archive.com/bmwuucdigest@uucdigest.com/msg00507.html>.*

[uucdigest] V3 #519, Mar. 28, 2000 (10 pages). Online retrieved at <http://www.google.com/search?q=uucdigest+conforti+shark+march+2000&hl=en>.*

* cited by examiner

METHOD AND APPARATUS FOR REPROGRAMMING ENGINE CONTROLLERS

CROSS-REFERENCE TO RELATED APPLICATION

This application claims the benefit under 35 U.S.C. §119 of provisional application No. 60/279,711 filed Mar. 30, 2001 and entitled Method and Apparatus for Programming Engine Controllers.

TECHNICAL FIELD

This invention relates to engines of the type which include computerized engine controllers. In particular, the invention relates to methods and apparatus for upgrading the software which runs on the computerized engine controller for an engine.

BACKGROUND

Most internal combustion engines used in modern trucks and automobiles are controlled by a computerized engine controller. The engine controller typically controls a wide range of vehicle operating parameters including spark ting, throttle settings, and so on. Computerized engine controllers typically run software stored on a non-volatile memory, such as an E-PROM chip.

The software in a computerized engine controller can significantly affect the performance of the engine being controlled. Car enthusiasts have learned that the performance of certain engines can be significantly increased by making changes to the engine control software. Such performance increases are relatively easy to achieve, because they do not require making physical modifications to the engine itself. Furthermore, they are reversible.

Upgraded software may provide various benefits. For example, it may remove a speed limit imposed by a top speed governor, raise a limit imposed by a revolutions per minute limiter, or the like. Upgraded engine control software may accomplish other performance improvements by, for example, changing the engine control software to alter fuel enrichment, cam timing, ignition toning and other engine operating parameters.

For example, the performance of late model BMW cars (1996-present) can be improved by replacing the stock software of the engine controller with software which provides higher performance. Early attempts to provide upgraded engine control software typically involved physically removing (from the engine controller) a chip which contained stock software and replacing the chip with a new memory chip containing upgraded software. This is disadvantageous as it involves making physical modification to the engine controller, risks damaging the engine controller during the course of such modifications, and is not readily reversible.

One problem encountered in upgrading the engine control software for an engine is that, for any particular engine type, there are often a number of different versions or variants of the stock engine control software. Different versions may even be present in cars having the same model and year. For example, there are over seventeen different software versions for certain late model BMW cars.

Most late model cars include an onboard diagnostics (OBDII) port. Typically the OBDII port provides a data channel, which permits reprogramming of the engine controller. Vehicles equipped with an OBDII compliant engine controller typically lack easily removable and replaceable "chips". Car dealers typically have diagnostic systems which permit new software to be loaded into the engine controller. Such diagnostic systems are generally too expensive to be practically purchased or used by an individual car owner.

There is a need for an efficient way to alter the software of a computerized engine controller.

SUMMARY OF THE INVENTION

The invention relates to methods and apparatus for altering the software of engine controllers.

One aspect of the invention provides methods for upgrading software in an engine controller by determining a version of the current software in the engine controller, identifying one or more data blocks of upgraded software associated with the current software and replacing one or more data blocks of the current software with the one or more data blocks of upgraded software. The current software may be a version of the stock software.

The method may comprise storing an image of the current software before replacing the one or more data blocks of current software. Replacing one or more data blocks of current software with one or more data blocks of upgraded software may comprise downloading a data stream into the engine controller, where the data stream is made up of the image of the current software modified by replacing one or more data blocks of the image with the one or more data blocks of upgraded software. The data stream may be formed in memory prior to downloading the data steam into the engine controller or may be formed dynamically while downloading the data stream into the engine controller. Forming the data stream dynamically may comprise: downloading the image of the current software from the memory until reaching a first memory location; then downloading the block of upgraded software; and then resuming downloading the image from the memory commencing at a second memory location. The second memory location may be spaced apart from the first memory location by the size of the block of upgraded software.

The method may use information stored in a memory, which identifies a plurality of software versions and one or more data blocks of upgraded software associated with each of the plurality of software versions. The information may also specify a location for insertion (into an associated software version) of each data block of upgraded software.

The method may also comprise subsequently restoring the current software by downloading the image of the current software back into the engine controller.

The method may also comprise requesting and storing a first identification number from the engine controller prior to upgrading the software of the engine controller for a first time. The first identification number may be unique to the engine controller. Thereafter, the method may involve requesting an identification number from a connected controller and verifying at the identification number matches the first identification number. The identification number may comprise a vehicle identification number (VIN).

The method may also comprise monitoring status information during the replacement the one or more data blocks of the current software. If an interruption occurs, the status information may be used to resume replacing the one or more data blocks of the current software from a state immediately prior to the interruption. Similarly, the invention may comprise monitoring status information during the restoration of the current software. If an interruption occurs, the status information may be used to resume restoring the current software from a state immediately prior to the interruption. The status information may comprise a marker.

The method may also comprise upgrading the information, to identify one or more additional software versions. This upgrading may involve recording a version identifier, which assists with upgrading the information by identifying a version of the current software that is not identified in the information. Alternatively, this upgrading may involve storing the entire version of the current software that is not identified in the information.

The method may include a number of verification checks, including: verifying that the version of the current software in the engine controller corresponds with one of the plurality of software versions identified in the information; verifying that the image of the current software matches the current software in the engine controller; and verifying that the software in the engine controller is an upgraded version of the image of the current software prior to performing a restore operation.

The method may involve outputting information to users, including: an error in communicating with the engine controller; a low operating voltage; a failure to recognize hardware associated with the engine controller; an error erasing data from the engine controller; an error storing data to the engine controller; and an attempt to upgrade software that has already been updated.

Another aspect of the invention provides a method of upgrading software in an engine controller. The method comprises: providing information that identifies a plurality of software versions and provides one or more blocks of upgraded software associated with each of the plurality of software revisions; determining a version of the current software in the engine controller and, based on the version, identifying a set comprising one or more blocks of upgraded software; and replacing one or more blocks of the current software with the set of one or more blocks of upgraded software.

Another aspect of the invention provides an apparatus for upgrading software in an engine controller. The apparatus comprises; an interface configured to communicate data to and from the engine controller; a memory, which stores information identifying a plurality of software versions and one or more data blocks of upgraded software associated with each of the plurality of software versions; and a processor. The processor communicates with the memory and the interface and is configured to: determine a version of current software in the engine controller; identify one or more data blocks of upgraded software associated with the version of the current software; and replace one or more data blocks of the current software with the one or more data blocks of upgraded software.

The apparatus may comprise a user interface. Preferably, the user interface will have one or more outputs, which may be; (a) an output for indicating whether the version of the current software in the engine controller corresponds with one of the plurality of software versions identified in the information; (b) an output for indicating whether the image of the current software stored in memory matches the current software in the engine controller; (c) an output for indicating an error in communication with the engine controller; (d) an output for indicating a low operating voltage; (e) an output for indicating a failure to recognize hardware associated with the engine controller; (t) an output for indicating an error erasing data from the engine controller; and (g) an output for indicating an attempt to upgrade software that has already been upgraded. These outputs may be provided by one or more lights configured to flash intermittently in a manner representing a codification scheme. The lights may be LED's and the codification scheme may have a unique flash sequence for each of the above outputs.

Another aspect of the invention provides a machine readable medium carrying data. The data comprises: information identifying a plurality of software versions and one or more data blocks of upgraded software associated with each of the plurality of software versions; and a set of instructions which, when executed by a data processor, configure the data processor to upgrade current software in an engine controller. The processor upgrades the current software in the engine controller by: determining a version of the current software in the engine controller, and replacing one or more data blocks of the current software with the one or more data blocks of upgraded software associated with the version of the current software.

Other aspects of the invention provide other methods, apparatus and computer program products. Further aspects of the invention and features of specific embodiments of the invention are described below.

BRIEF DESCRIPTION OF THE DRAWINGS

In drawings which illustrate non-limiting embodiments of the invention.

DETAILED DESCRIPTION

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

Figure 1:
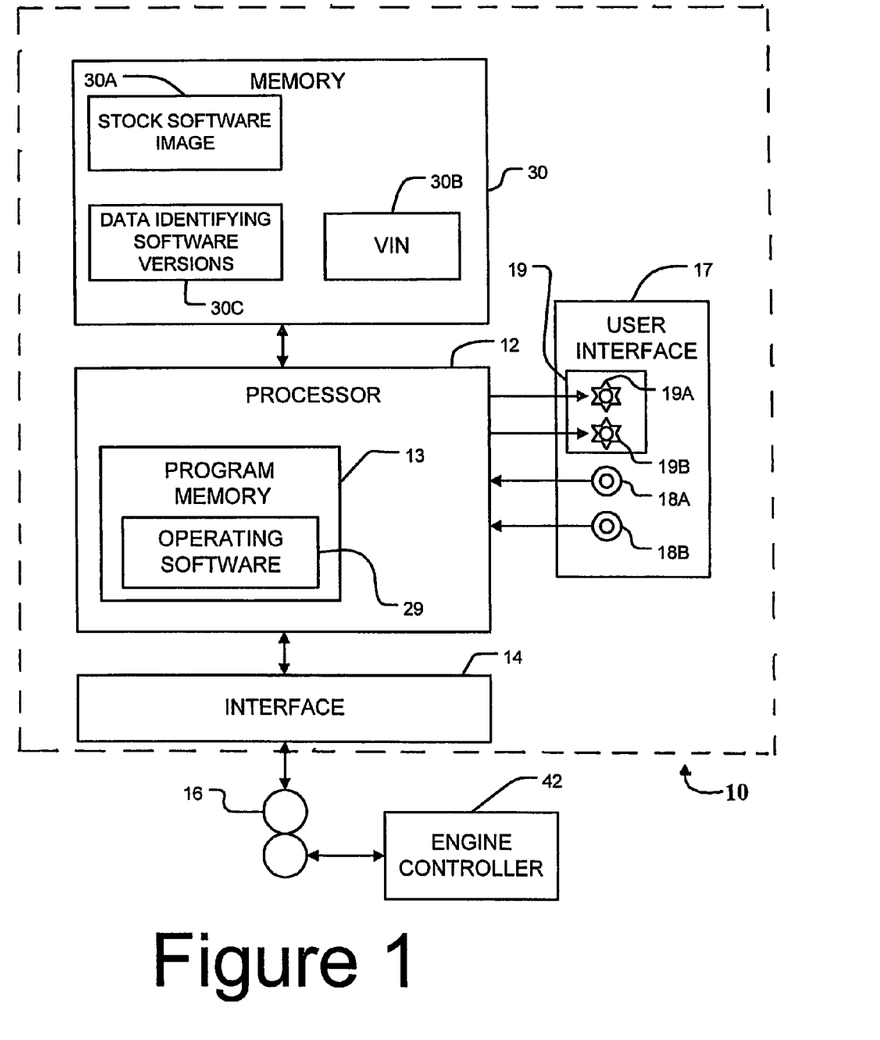
FIG. 1 is a block diagram of software loading apparatus according to a specific embodiment of the invention.

FIG. 1 depicts a schematic diagram of a specific embodiment of the invention. As shown in FIG. 1, an apparatus 10 comprises a processor 12, which communicates with an interface 14 for the purposes of altering the software of an engine controller 42. Processor 12 may comprise a microprocessor, computer-on-a-chip, the CPU of a computer or any other suitable microcontroller.

Interface 14 connects to the pins (not shown) of a connector 16 suitable for plugging into an onboard diagnostic port or other connector associated with engine controller 42. Interface 14 may comprise, for example, an auto serial interface. The protocols used to communicate with engine controllers, the types of connectors used, and the like are general knowledge to those skilled in the art and so will not be described further in this description.

Processor 12 has access to a program memory 13, which contains operating software 29. Operating software 29 comprises a sequence of instructions, which are executed by processor 12 when processor 12 is operating. Processor 12 has a user interface 17, which permits users to instruct processor 12 to either upgrade the software of engine controller 42 to an upgraded version or to restore the software to an original state.

In the illustrated embodiment of the invention, user interface 17 is extremely simple and comprises a pair of switches 18A and 18B, which can be operated by a user. In the illustrated embodiment, switches 18A and 18B comprise pushbuttons. Preferably, user interface 17 also includes a display 19 that indicates the status of apparatus 10. In the illustrated embodiment, display 19 comprises a pair of lamps, 19A and 19B, which may comprise, for example, light-emitting diodes. Of course, other more complicated user interfaces 17 that provide the user with more information, error messages and/or programming options could be provided in the context of this invention.

Software for an engine controller may take up a fairly large amount of memory. For example, the software for a typical BMW engine controller requires 32 kilobytes of storage. As noted above, an engine controller may operate with any one of several versions of the stock engine control software. Were apparatus 10 to store a complete copy of all possible versions of stock engine control software, then considerable storage space would need to be allocated for this purpose. This memory requirement would increase the cost of apparatus 10. Therefore, in the preferred embodiment of the invention, apparatus 10 only stores only differences between stock engine control software and upgraded engine control software.

Throughout this description and the accompanying claims, the phrases "stock engine control software" and "stock software" are used to refer to any version of software stored in an engine controller which has not been upgraded according to this invention or which has been upgraded and subsequently restored according to this invention. Stock engine control software may be installed by any number of people, including: vehicle manufacturers, vehicle dealerships, and/or aftermarket mechanics.

Processor 12 can retrieve and store data to a memory 30. Memory 30 is preferably a non-volatile type of memory, such as a Flash RAM or the like. In the preferred embodiment of the invention, a non-volatile memory in apparatus 10 (which may comprise, for example, a portion 30C of memory 30) contains data identifying a plurality of engine control software versions. The data may comprise a list of known engine control software versions. Associated with each version in the list is a number (one or more) of data blocks, which may be used to replace corresponding portions of stock engine control software to provide upgraded engine control software. In general, these data blocks may be data, instructions for execution on a processor in the engine controller or a combination of data and instructions. Also associated with each version is information, for example an offset, that specifies where each of the one or more data blocks is to be inserted into the corresponding version of stock engine control software. In some cases, especially for versions of stock software that differ only slightly from one another, the same upgrade software block may be used in upgrading more than one software version. In such cases, the upgrade software block may be inserted at the same location in each version of stock software (i.e. the same offset) or the upgrade software block may be inserted at different locations for each version of stock software (i.e. different offsets).

When apparatus 10 is first activated, processor 12 commences executing the instructions contained in operating software 29. These instructions cause processor 12 to interrogate engine controller 42 to which it is connected by way of connector 16. Engine controller 42 responds to the interrogation by providing a code (or codes), which identifies the type of engine controller hardware and the version of the software currently installed on engine controller 42.

Operating software 29 causes processor 12 to compare the code(s) returned by engine controller 42 to the list of known software versions. If the result of the comparison indicates that the current engine control software version is known to apparatus 10, then the process of upgrading the engine control software can proceed. Otherwise, the user will need to have apparatus 10 upgraded prior to upgrading the current software in question.

For each known version of engine control software, apparatus 10 stores only differences between the upgraded and known version of engine control software. The differences are essentially replacement data blocks for selected portions of the stock software.

Apparatus 10 operates by reading in the current engine control software from engine controller 42 through connector 16 and writing the current software into memory 30 to form an image 30A of the current software. Since the current software will typically be a version of the stock software, the current software is often referred to as "stock software" and image 30A is often referred to as the "stock software image" throughout this description. After stock software image 30A has been assembled in memory 30, then apparatus 10 reprograms engine controller 42 by sending out upgraded software through connector 16. The upgraded software may be created in one of two manners. In one manner, stock software image 30A is altered in memory 30 by replacing one or more selected blocks of stock software image 30A with replacement blocks of upgraded software. The replacement blocks of upgraded software must be selected to work with the version of the current engine control software. After replacing the software blocks in image 30A, the altered image of the software is downloaded through interface 14 into engine controller 42.

In a second manner of operation, apparatus 10 dynamically reprograms engine controller 42. Stock software image 30A is downloaded from memory 30 out through connector 16. Operating software 29 monitors the progress of this download and, at one or more points where the upgraded software is to be different from the stock software image 30A, processor 12 inserts an upgraded replacement block into the outgoing data stream in place of a corresponding block of stock software image 30A. Thus, the upgraded software downloaded into engine controller 42 is dynamically formed "on the fly". An unaltered image of stock so re image 30A is retained in memory 30. The stock software image 30A may be retained and used subsequently in restoring the stock software to engine controller 42. When restoring the stock engine control software, stock software image 30A can simply be downloaded to the engine controller 42 through interface 14 and connector 16.

Sometimes a mechanic will update engine control software while a vehicle is being serviced. If the mechanic updates the software to a newer stock software version, then the stock software version number will change. A problem occurs if this happens to a vehicle that is rung upgraded engine control software. If a user subsequently instructs apparatus 10 to restore the stock software, then the software would be restored to the previous, older, version of the stock software (i.e. the version of the stock software that was used to create stock software image 30A). To avoid this problem, apparatus 10 preferably checks the version number and check sum of the software currently installed in engine controller 42 before restoring the engine control software from stock software image 30A. If apparatus 10 detects that the currently installed version of the software or the check sum of the currently installed software is different from what is expected of an upgraded version of the stock software image 30A, then apparatus 10 does not proceed with the restore operation.

Preferably apparatus 10 is configured so that it can be used only with one specific engine controller 42. This may be accomplished, for example, by causing operating software 29 to request a serial number from engine controller 42. Where engine controller 42 is the engine controller for an automobile, then typically the VIN (vehicle identification number) is used as a serial number and engine controller 42 will provide that VIN upon request. Most typically, operating software 29 causes processor 12 to request the VIN from the engine controller 42 by way of connector 16. When a response is received, the VIN is stored in a location 30B in memory 30. Subsequently, each time apparatus 10 is connected to a new engine controller, it requests the VIN from the engine controller and compares that VIN to the VIN stored in memory area 30B. If the two VINs do not match, then apparatus 10 does not continue. If the two VINs do match, then apparatus 10 will continue to allow a user to modify the software in the connected engine controller. This VIN verification not only prevents product theft, but also ensures consistency when operating in a fail-safe mode and when restoring the stock software to the engine controller.

Preferably, apparatus 10 retrieves the VIN as a portion of a data block known as the AIF. The AIF information, including the VIN, may be stored in a memory area in memory 30.

Preferably, apparatus 10 maintains state information about its current operation. If communication with engine controller 42 is interrupted while an operation is being performed, then operating software 29 uses the state information to cause the disrupted operation to be automatically resumed the next time apparatus 10 is used. The state information may comprise, for example, a marker recorded by processor 12. The marker may be set when an operation commences and identifies the operation (e.g. upgrade or restore). The marker may be cleared after the operation completes successfully. If an upgrade or a restore is interrupted, then processor 12 would that the appropriate marker is set and repeats the marked operation if engine controller 42 does not contain a valid version (either upgraded or stock) of the engine control software. Other schemes which maintain records of intermediate steps in an operation could also be used. For example, the marker may point to the location at which an upgrade or restore operation was interrupted, such that the operation can continue from the point where it was immediately prior to the interruption.

Preferably after apparatus 10 retrieves stock software image 30A from engine controller 42 and stores it into memory 30, the apparatus performs a checksum or other integrity check on the data contained in stock software image 30A. This checksum can be used to ensure that the software image 30A accurately matches the stock software in engine controller 42.

If the software version installed on engine controller 42 is a new version number which is not known to apparatus 10, then preferably processor 12 causes user interface 17 to display some signal, which indicates to the user that the user should return apparatus 10 to the manufacturer to be upgraded. Preferably apparatus 10 stores the version number of the unknown engine control software or some indication thereof, in so that the manufacturer can determine the particular upgrade necessary.

From time to time it may be necessary to upgrade apparatus 10. For example, it may become necessary to store in apparatus 10 information about how to upgrade new versions of engine control software. This may be done, for example, by connecting apparatus 10 to a computer (not shown) by way of a suitable communications port. Apparatus 10 may comprise a separate port for communication with a computer or may use an adaptor which connects to connector 16 and provides a separate connector for establishing data connection with a personal computer. The separate connector may, for example, comprise an infrared link, a USB port, a serial port adaptor, a parallel port adaptor, or the like.

As noted above, when apparatus 10 is activated it begins by sending an interrogating command to connector 16. When apparatus 10 is connected to a properly programmed computer (i.e. rather than an engine controller), then the computer responds to this command with a sequence of data that causes processor 12, under the control of operating software 29, to place apparatus 10 into a "slave mode". In slave mode, any portion of the memory in apparatus 10 can be set under control of the computer by downloading suitable computer instructions and/or data into apparatus 10. For example, apparatus 10 could receive identification codes for engine controllers which use new versions of engine control software together with data for upgrading such versions of engine control software.

Figure 2:
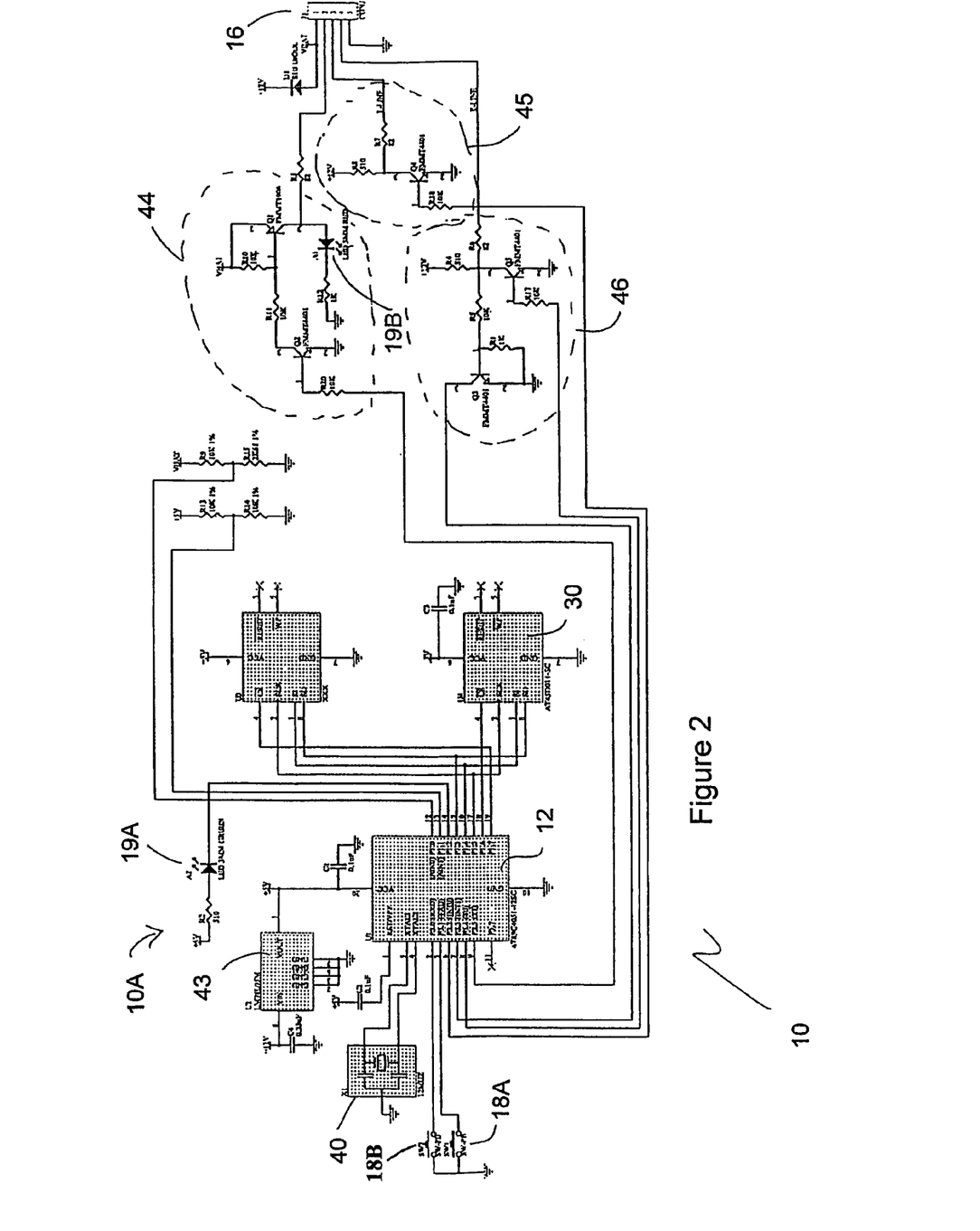
FIG. 2 is a schematic diagram of an apparatus according to a specific embodiment of the invention.

FIG. 2 shows a schematic diagram of apparatus 10 according to a specific embodiment of the invention. In the embodiment of FIG. 2, microprocessor 12 is a suitable microprocessor such as an Atmel™ AT89C4051 processor, which has 4 k of onboard program memory. Memory 30 may comprise, for example, an Atmel™ AT41D011 128 k data flash memory. FIG. 2 shows various other common components such as a crystal 40, a voltage regulator 43, and transistor drive circuits 44, 45 and 46, which are used to provide an interface to the standard automotive diagnostic bus or such other diagnostic bus as may be used in the engine controllers to be programmed by apparatus 10. Such components and their selection and use are well known to those skilled in the art and are therefore not described here in detail.

Preferably software 29 detects various conditions relating to any attempted upgrade and provides to the user a status code or error message by way of user interface 17. Where user interface 17 comprises a light-emitting diode or other on/off type visual indicator, then the status code may be communicated, for example, by causing the status indicator to turn on and off so as to flash out a code. Some examples of codes that may be returned include:

the voltage supplied by way of connector 16 is too low to adequately operate apparatus 10;

engine controller 42 is of a type not known to apparatus 10;

an upgrade is being attempted, but the version of the software already present in engine controller 42 is not stock software;

the version of the software currently installed in engine controller 42 is not known to apparatus 10;

there has been a failure in the stored upgrade data within apparatus 10;

there is a mismatch in the VIN (i.e. apparatus 10 was previously used on a different vehicle); or the user request is, for some other reason, improper.

Typically, the foregoing codes are generated as a result of events which occur prior to an upgrade being attempted. Consequently, the vehicle, or other engine connected to engine controller 42, will remain drivable, since its existing engine control software will not yet have been altered.

Additionally, apparatus 10 may generate codes, error messages or other indications that indicate various faults which have occurred while the software in engine controller 42 is being altered. Such faults could possibly leave the software in engine controller 42 in a state which prevents the engine from properly operating. These indications may include, for example, indications for the following:

engine controller 42 not responding;
engine controller 42 has sent a message indicating an error;
protocol error busy;
protocol error rejected;
protocol error in a parameter;
protocol error in a function;
engine controller 42 has generated an unknown reply;
engine controller 42 has indicated a failure in final verification;
engine controller 42 has indicated an erase failure; or
check sum mismatch has occurred.

Figure 3:
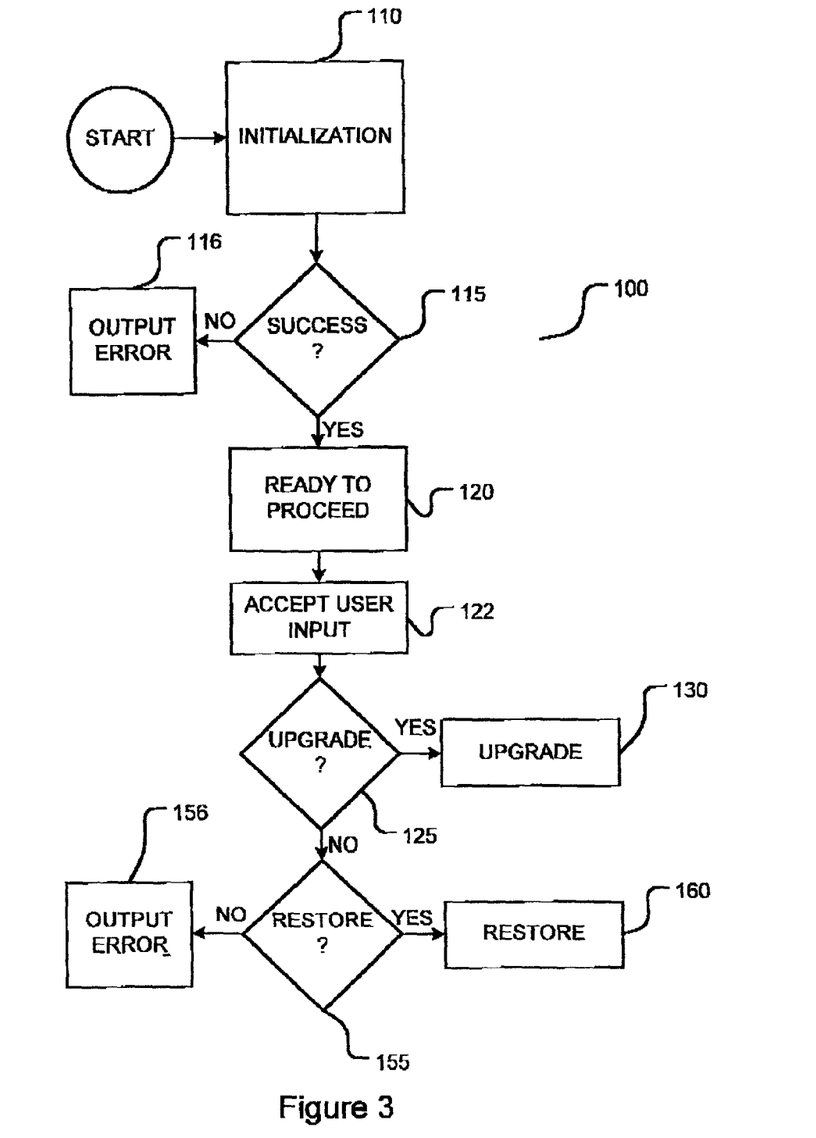
FIG. 3 is a flow char depicting a part of the process of alter engine control software according to a particular embodiment of the invention.
Figure 4:
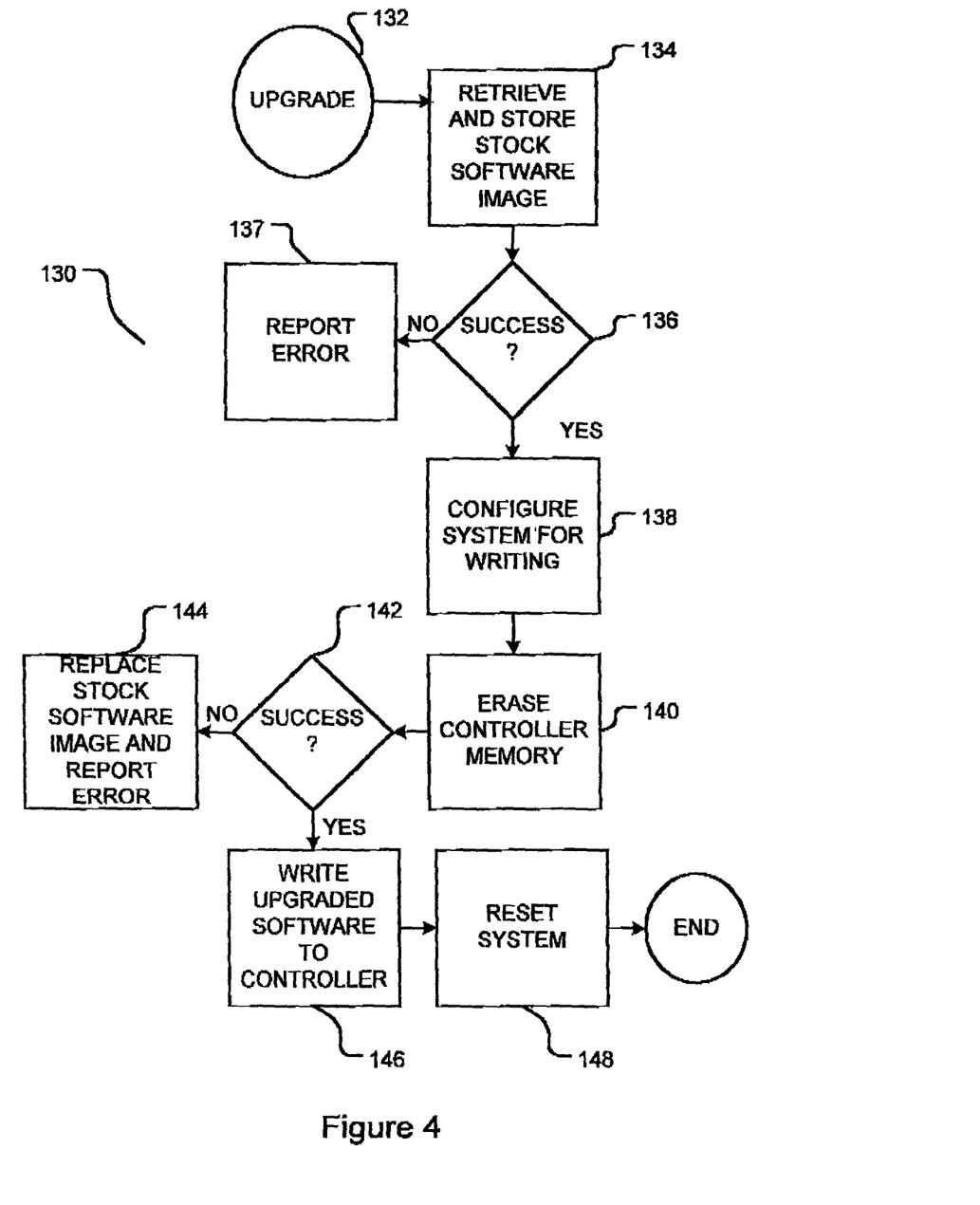
FIG. 4 is a flow chart depicting a part of the process for upgrading the engine control software according to a particular embodiment of the invention.
Figure 5:
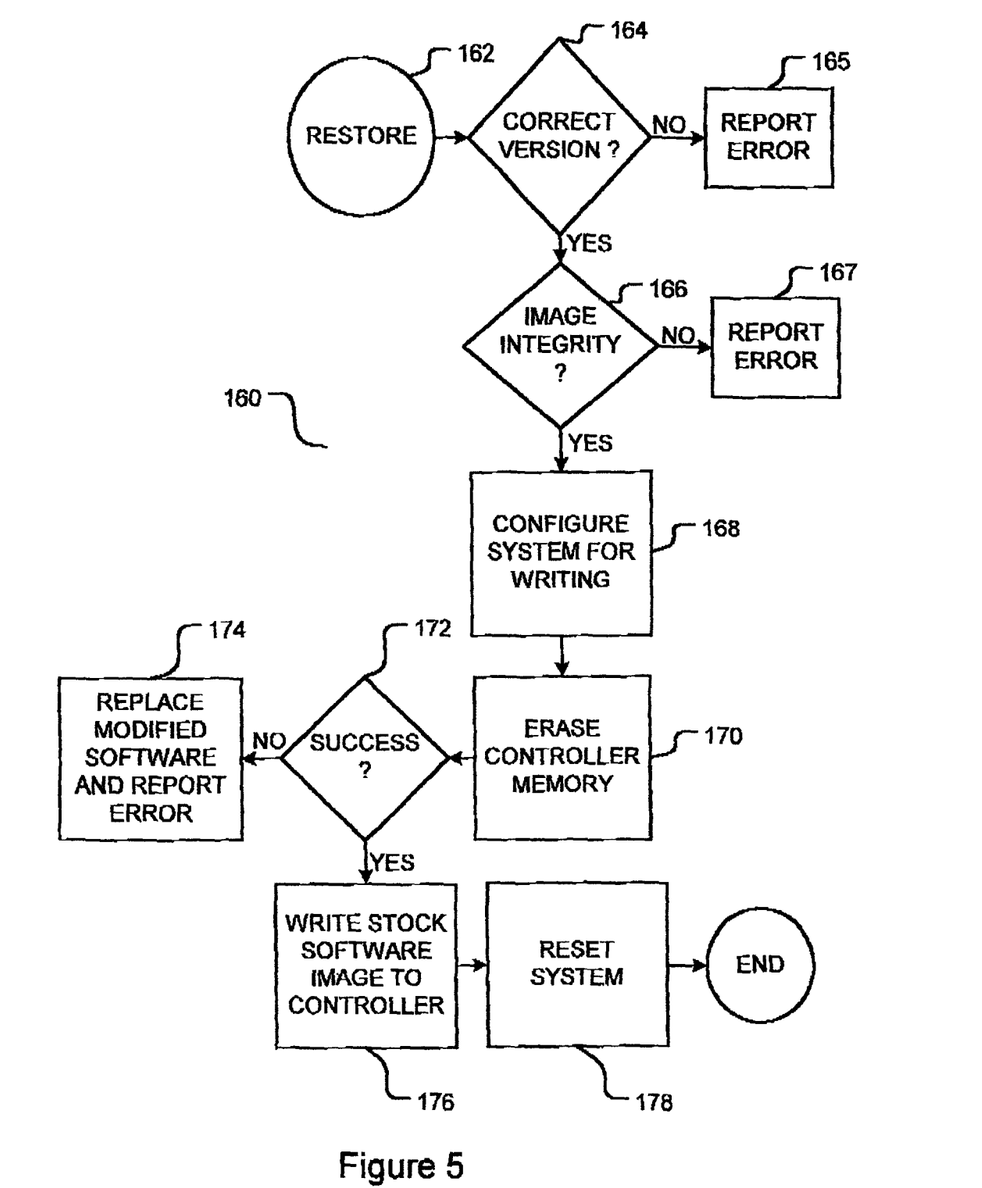
FIG. 5 is a flow chart depicting a part of the process for restoring the engine control software according to a particular embodiment of the invention.

A particular embodiment of the process for altering and/or restoring the stock software in engine controller 42 is depicted in FIGS. 3-5. Referring to FIG. 3, when apparatus 10 is energized, operating software 29 causes processor 12 to be initialized and processor 12 initializes the other parts of apparatus 10 as part of initialization process 110. After initialization, operating software 29 checks (in block 115) to determine if the initialization was successful. If so, then software 29 causes user interface 17 to display a status indicator in block 120, which indicates that apparatus 10 is ready to proceed. In block 122, processor 12 waits for a user to press one of buttons 18A and 18B to indicate either an upgrade operation 130 or a restore operation 160.

During initialization process 110, operating software 29 preferably causes processor 12 to test to determine whether the operating voltage is sufficient. If the operating voltage is too low for reliable operation of if the initialization fails for some other reason, then an error is reported to the user in block 116 by way of user interface 17.

Preferably as part of the initialization process 110, a check is performed to confirm that memory 30 is properly configured. An error is reported via user interface 17 in block 116 if memory 30 is not configured.

During initialization process 110, operating software 29 causes processor 12 to request the AIF information, determine the read transfer length, and read the check sum from a connected engine controller 42. If VIN storage space 30B is blank, then processor 12 writes the AIF to memory area 30C. Otherwise, processor 12 compares the VIN previously stored in area 30B to the VIN in the AIF retrieved from engine controller 42 and reports an error in block 116 if these do not match.

During initialization process 110, operating software 29 disables writing to memory 30, reads the current engine control software from engine controller 42 and computes a checksum. The checksum and information in the AIF retrieved from engine controller 42 are compared to parameters in memory 30 to determine:

whether engine controller 42 is known to apparatus 10;
if so, whether the version of software in engine controller 42 is known to apparatus 10; and,
whether the check sum matches what is expected for that version of software.

If the result of these checks indicates that apparatus 10 does not have stored information corresponding to the version of the stock software contained in engine controller 42, then processor 12 enables writing to memory 30 and generates an error signal on user interface 17 in block 116. The error signal indicates that apparatus 10 should be returned to its manufacturer for an upgrade. Preferably, processor 12 reads the version number of the current software in engine controller 42 (or retrieves an image of the current software from engine controller 42), and writes that version information (or image) to memory 30, so that the manufacturer will know what software version the user requires.

If the result of all of these initialization checks indicate that the initialization has succeeded and that the software version number retrieved from engine controller 42 matches a software version number stored in apparatus 10, then the system progresses to block 120 and is ready to proceed. In block 121, apparatus 10 waits for a user to select whether an upgrade operation or a restore operation should be attempted. If the user presses button ISA indicating an upgrade, then an upgrade marker is set and processor 12 jumps to "upgrade" in block 130. Otherwise, if the user presses button 18B indicating a restore operation, then a restore marker is set and processor 12 jumps to "restore" in block 160. Otherwise, processor 12 generates an error signal in block 156.

A flow diagram of an upgrade method 130 is depicted in FIG. 4. The upgrade method 130 comprises:

In block 134, processor 12 enables write to memory 30, retrieves current engine control software from engine controller 42 and stores stock software image 30A; and,
In block 136, processor 12 generates and checks a checksum for stored stock software image 30A to confirm that it has been read and stored correctly (if not processor 12 generates an error in block 137).

As part of configuring the system for writing in block 138, processor 12:

Enables programming voltage for writing to engine controller 42;
Sends the necessary codes to engine controller 42 to enable erasing and writing its memory;
Checks system voltage again; and,
Sets an upgrade marker.

Processor 12 then prepares the memory of engine controller 42 to accept new software:

In block 10, processor 12 erases the program memory of engine controller 42; and,
In block 142, processor 12 disables writing to memory 30 and verifies that the memory of engine controller 42 is blank.

If the memory of engine controller 42 is not blank at this point, then something is wrong. As part of block 144, processor 12:

Writes stock software image 30A back to engine controller 42;
Disables the programming voltage; and,
Reports an error.
Otherwise, processor 12 proceeds to block 146, where it:
Writes a modified (i.e. upgraded) image to engine controller 42.

After writing the upgraded software to engine controller 42, processor 12 proceeds in block 148 by:

Disabling the programming voltage;
Disabling write to memory 30;
Looking up the software of stock software image 30A to confirm that it is valid and reporting an error if it is not;
Clearing the upgrade marker; and,
Resetting engine controller 42.

The upgrade process is then complete and apparatus 10 can be disconnected from engine controller 42, which has been upgraded.

If a user subsequently instructs apparatus 10 to restore the stock engine control software of image 30A, then processor 10 proceeds as above, until it jumps to restore process 160. A flow chart illustrating a possible restore method 160 is depicted in FIG. 5. In method 160, operating software 29 causes processor 12 to perform a number of blocks including:

In block 164, processor 12 verifies that the software currently in engine controller 42 is software in relation to which the restore operation is permitted (e.g. the software currently in engine controller is not a newer version of stock engine control software). If the restore operation is not allowed for the current engine control software, then processor 12 reports an error in block 165; and, In block 166, processor 12 computes a checksum for stock software image 30A stored in memory 30 to verify that it corresponds to the checksum expected for stock software corresponding to the current upgraded software in engine controller 42.

As part of configuring the system for writing in block 1687, processor 12:

Enables programming voltage for writing to engine controller 42;
Sends the necessary codes to engine controller 42 to enable erasing and writing its memory,
Checks the system voltage again; and,
Sets the restore marker.

Processor 12 then prepares the memory of engine controller 42 to accept new software:

In block 170, processor 12 erases the memory of engine controller 42, disables writing to memory 30 and reads stock software image 30A; and,
In block 172, processor 12 checks to see if the memory of engine controller 42 is blank.

If the memory of engine controller 42 is not blank at this point, then something is wrong. As part of block 174, processor 12:

Writes the modified software back to engine controller 42;
Disables the programming voltage; and,
Reports an error.
Otherwise, processor 12 proceeds to block 176, where it:
Writes stock software image 30A to engine controller 42.
After writing the stock software image 30A back to engine controller 42, processor 12 resets the system in block 178 by:
Disabling the programming voltage;
Disabling writing to memory 30;
Clearing the restore marker; and,
Resetting engine controller 42.

The restoration process is then complete and apparatus 10 can be disconnected from engine controller 42, which has been reprogrammed with the original stock engine control software.

Certain implementations of the invention comprise computer processors which execute software instructions which cause the processors to perform a method of the invention. The invention may also be provided in the form of a program product. The program product may comprise any medium which carries a set of computer-readable signals comprising instructions which, when executed by a data processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The program product may also comprise data, databases or other information which may be accessible to, but not necessarily executed by, a processor.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

if an engine controller provides a wireless data interface, then interface 14 may comprise a wireless interface and physical connector 16 would not be required; and
the data blocks of upgraded software may be, but are not necessarily the same size. The blocks of upgraded software may be very small or any larger size that is smaller then the engine control software being upgraded.

What is claimed is:

1. A method for upgrading software in an engine controller, the method comprising:

placing an engine controller reprogramming apparatus in data communication with the engine controller and, at the engine controller reprogramming apparatus;
determining a version of current software in the engine controller and requesting from the engine controller and storing in the engine controller reprogramming apparatus a first identification number from the engine controller;
identifying one or more data blocks of upgraded software associated with the version of current software, the one or more data blocks constituting less than all of the version of current software; and
replacing one or more data blocks of the current software with the one or more data blocks of upgraded software;
wherein replacing the one or more data blocks of current software comprises:
uploading from the engine controller to the engine controller reprogramming apparatus an image of the current software and storing the image of the current software in a memory of the engine controller reprogramming apparatus;
at the engine controller reprogramming apparatus, creating a modified version of the current software at the engine controller reprogramming apparatus by replacing one or more data blocks of the image with the one or more data blocks of upgraded software and retaining at least some data blocks of the image in the modified version of the current software while retaining the uploaded image of the current software in the memory for restoration and downloading a data stream from the engine controller reprogramming apparatus into the engine controller, the data stream comprising the modified version of the current software including the one or more data blocks of upgraded software; and
monitoring status information and, if an interruption occurs, using the status information to resume replacing the one or more data blocks of the current software.

2. A method according to claim 1, wherein identifying the one or more data blocks of upgraded software comprises selecting the one or more data blocks of upgraded software based on information stored in a memory of the engine controller reprogramming apparatus, the information identifying a plurality of software versions including the version of current software in the engine controller and identifying one or more data blocks of upgraded software associated with each of the plurality of software versions.

3. A method according to claim 2, comprising, prior to identifying the one or more data blocks of upgraded software, verifying that the version of the current software corresponds with one of the plurality of software versions.

4. A method according to claim 3, comprising upgrading the information, such that the upgraded information identifies one or more additional software versions.

5. A method according to claim 4, wherein verifying that the version of the current software corresponds with one of the plurality of software versions comprises recording a version identifier, the version identifier identifying a version of the current software that is not identified in the information.

6. A method according to claim 4, wherein verifying that the version of the current software corresponds with one of the plurality of software versions comprises recording the current software into memory in circumstances where a version of the current software is not identified in the information.

7. A method according to claim 2, wherein for each of the plurality of versions, the information comprises locations for insertion of the one or more data blocks of upgraded software.

8. A method according to claim 1, comprising forming the data stream in the memory of the engine controller reprogramming apparatus prior to downloading the data stream into the engine controller.

9. A method according to claim 1, comprising forming the data stream dynamically at the engine controller reprogramming apparatus while downloading the data stream from the engine controller reprogramming apparatus into the engine controller.

10. A method according to claim 9, wherein forming the data stream dynamically comprises:
    downloading the image of the current software from the memory of the engine controller reprogramming apparatus until reaching a first memory location;
    downloading a block of upgraded software from the engine controller reprogramming apparatus into the engine controller; and
    resuming downloading the image from the memory of the engine controller reprogramming apparatus commencing at a second memory location that is spaced apart from the first memory location by a size of the block of upgraded software.

11. A method according to claim 1, comprising, prior to replacing the one or more data blocks of the current software, verifying that the image of the current software in the memory of the engine controller reprogramming apparatus matches the current software in the engine controller.

12. A method according to claim 1, comprising, subsequent to replacing the one or more data blocks of the current software, restoring the current software by downloading the unaltered image of the current software from the memory of the engine controller reprogramming apparatus back into the engine controller.

13. A method according to claim 11, comprising, prior to restoring the current software, verifying that software in the engine controller is an upgraded version of the unaltered image of the current software.

14. A method according to claim 12, comprising requesting from the engine controller a subsequent identification number and at the engine controller reprogramming apparatus performing at least one of: verifying that the subsequent identification number matches the first identification number prior to replacing the one or more data blocks of the current software for a subsequent time; and verifying that the subsequent identification number matches the first identification number prior to restoring the current software.

15. A method according to claim 12, wherein the first identification number comprises a vehicle identification number.

16. A method according to claim 12 comprising maintaining at the engine controller reprogramming apparatus status information during restoring the current software.

17. A method according to claim 16, wherein the status information comprises a marker.

18. A method according to claim 1, comprising maintaining at the engine controller reprogramming apparatus status information during replacing the one or more data blocks of the current software.

19. A method according to claim 18, wherein the status information comprises a marker.

20. A method according to claim 1 comprising, at the engine controller reprogramming apparatus, outputting an indication to users of an occurrence of one or more of: an error in communication between the engine controller reprogramming apparatus and the engine controller; a low operating voltage; a failure to recognize hardware associated with the engine controller; an error erasing data from the engine controller; an error storing data to the engine controller; and an attempt to upgrade software that has already been upgraded.

21. A method of upgrading software in an engine controller, the method comprising:
    providing in an engine controller reprogramming apparatus information identifying a plurality of software versions and one or more blocks of upgraded software associated with each of the plurality of software versions;
    at the engine controller reprogramming apparatus determining a version of current software in the engine controller and requesting from the engine controller and storing in the engine controller reprogramming apparatus a first identification number from the engine controller;
    identifying, from within the information, one or more blocks of upgraded software associated with the version of the current software;
    replacing one or more blocks of the current software with the one or more blocks of upgraded software associated with the version of the current software to create at the engine controller reprogramming apparatus a modified version of the current software, the one or more blocks of upgraded software constituting less than all of the version of current software by:
        uploading from the engine controller to the engine controller reprogramming apparatus an image of the current software and storing the image of the current software in a memory of the engine controller reprogramming apparatus; and
        downloading from the engine controller reprogramming apparatus to the engine controller a data stream comprising the modified version of the current software the data stream obtained by modifying the image of the current software at the engine controller by replacing the one or more data blocks of the image with the one or more blocks of upgraded software according to the information while retaining as part of the modified version at least some data from the image while retaining the uploaded image of the current software in the memory of the engine controller reprogramming apparatus for restoration; and at the engine controller reprogramming apparatus monitoring status information while replacing the one or more blocks of the current software and, if an interruption occurs, using the status information to resume replacing the one or more blocks of the current software.

22. A method according to claim 21, comprising, prior to identifying the one or more blocks of upgraded software, verifying that the version of the current software corresponds with one of the plurality of software versions.

23. A method according to claim 21, wherein, for each of the plurality of versions, the information comprises locations for insertion of one or more blocks of upgraded software.

24. A method according to claim 21, comprising forming the data stream in the memory of the engine controller reprogramming apparatus prior to downloading the data stream into the engine controller.

25. A method according to claim 21, comprising forming the data stream dynamically in the engine controller reprogramming apparatus while downloading the data stream into the engine controller.

26. A method according to claim 25, wherein forming the data stream dynamically comprises:
  downloading the image of the current software from the memory of the engine controller reprogramming apparatus until reaching a first memory location;
  downloading a block of upgraded software from the engine controller reprogramming apparatus to the engine controller; and
  resuming downloading the image from the memory of the engine controller reprogramming apparatus commencing at a second memory location that is spaced apart from the first memory location by a size of the block of upgraded software.

27. An apparatus for upgrading software in an engine controller, the apparatus comprising:
  an interface configured to communicate data to and from the engine controller;
  a memory, which stores information identifying a plurality of software versions and one or more data blocks of upgraded software associated with each of the plurality of software versions; and
  a processor in communication with the memory and the interface, the processor configured to:
    determine a version of current software in the engine controller and request from the engine controller and store in the memory a first identification number from the engine controller;
    identify one or more data blocks of upgraded software associated with the version of the current software; and
    replace one or more data blocks of the current software with the one or more data blocks of upgraded software to create at the apparatus a modified version of the current software, the one or more data blocks constituting less than all of the modified version of current software by:
      obtaining an image of the current software from the engine controller and storing that image in the memory;
      while retaining the obtained image of the current software in the memory for restoration, forming a data stream and downloading the data stream into the engine controller in order to replace the current software with the modified version of the current software, the data stream comprising the modified version of the current software, the data stream obtained by modifying the image of the current software at the apparatus by replacing one or more data blocks of the image with the one or more data blocks of upgraded software the data stream including at least some unmodified data blocks of the image; and
    monitor status information while replacing the one or more data blocks of the current software and, if an interruption occurs, use the status information to resume replacing the one or more data blocks of the current software.

28. An apparatus according to claim 27, wherein the memory also stores information about a location for insertion of each data block of upgraded software into its associated software version.

29. An apparatus according to claim 27, wherein the processor is configured to form the data stream in the memory prior to the download of the data stream into the engine controller.

30. An apparatus according to claim 27, wherein the processor is configured to form the data stream dynamically during the download of the data stream into the engine controller.

31. An apparatus according to claim 27, wherein the processor is configured to restore the current software by downloading the unaltered image of the current software from the memory of the apparatus into the engine controller.

32. An apparatus according to claim 31, which comprises a user interface having at least one of:
  (a) an output for indicating whether the version of the current software in the engine controller corresponds with one of the plurality of software versions identified in the information;
  (b) an output for indicating whether the image of the current software stored in memory matches the current software in the engine controller;
  (c) an output for indicating an error in communication with the engine controller;
  (d) an output for indicating a low operating voltage;
  (e) an output for indicating a failure to recognize hardware associated with the engine controller;
  (f) an output for indicating an error erasing data from the engine controller; and
  (g) an output for indicating an attempt to upgrade software that has already been upgraded.

33. An apparatus according to claim 31 comprising a user interface, wherein the user interface comprises a light configured to flash in a manner representing a code of a codification scheme, the code indicating a status of the apparatus.

34. An apparatus according to claim 33, wherein the one or more data blocks of upgraded software are stored in at least one of: the data processor; the machine readable medium; and a memory in communication with the data processor.

* * * * *

UNITED STATES PATENT AND TRADEMARK OFFICE
CERTIFICATE OF CORRECTION

PATENT NO. : 8,458,689 B2
APPLICATION NO. : 10/112695
DATED : June 4, 2013
INVENTOR(S) : Roderick A. Barman and James Edward Conforti, Jr.

It is certified that error appears in the above-identified patent and that said Letters Patent is hereby corrected as shown below:

In the Specification

| Column | Line(s) | |
|--------|---------|---|
| 1 | 26 | Change "ting" to read "timing" |
| 1 | 44 | Change "toning" to read "timing" |
| 4 | 30 | Change "alter" to read "altering" |
| 6 | 49 | Change "so re" to read "software" |
| 10 | 14 | Change "ISA" to read "18A" |

Signed and Sealed this
Twentieth Day of May, 2014

Michelle K. Lee
*Deputy Director of the United States Patent and Trademark Office*